Jan. 15, 1924.
M. NUSS
1,481,221
PROCESS FOR SEPARATING GAS AND VAPOR MIXTURES
Filed March 21, 1923  2 Sheets-Sheet 1
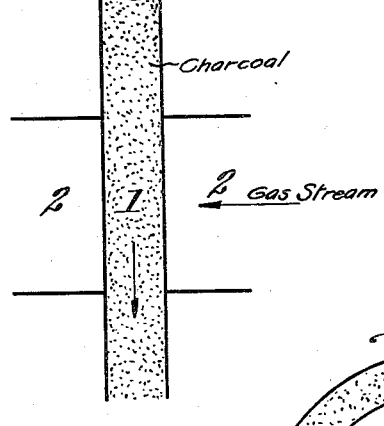
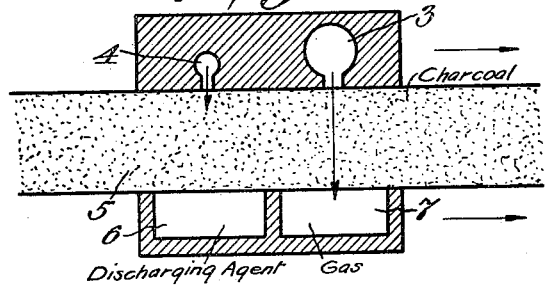
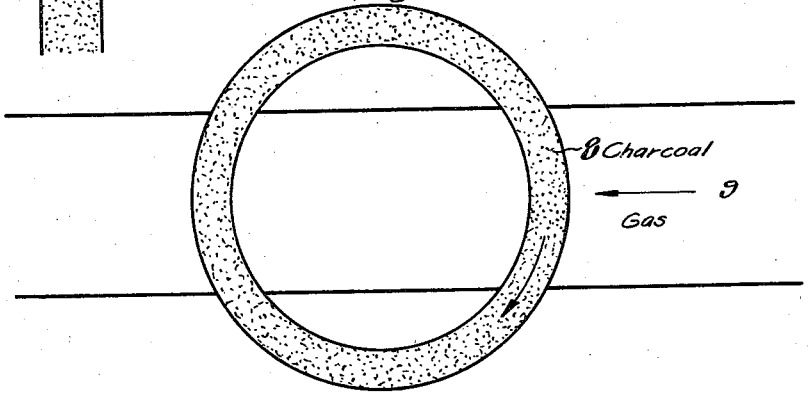
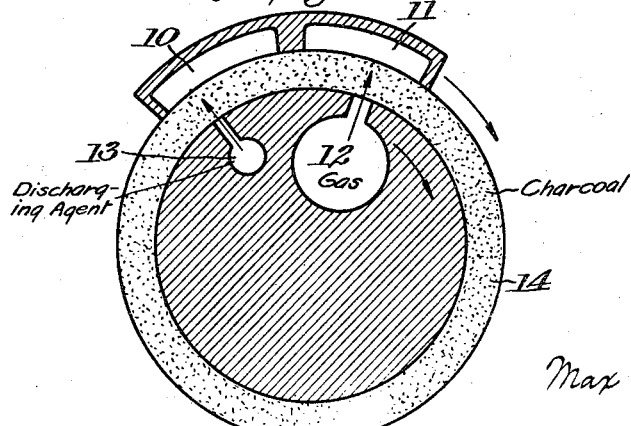
Inventor:
Max Nuss
By Byrnes Townsend & Brickenstein
Attorneys.

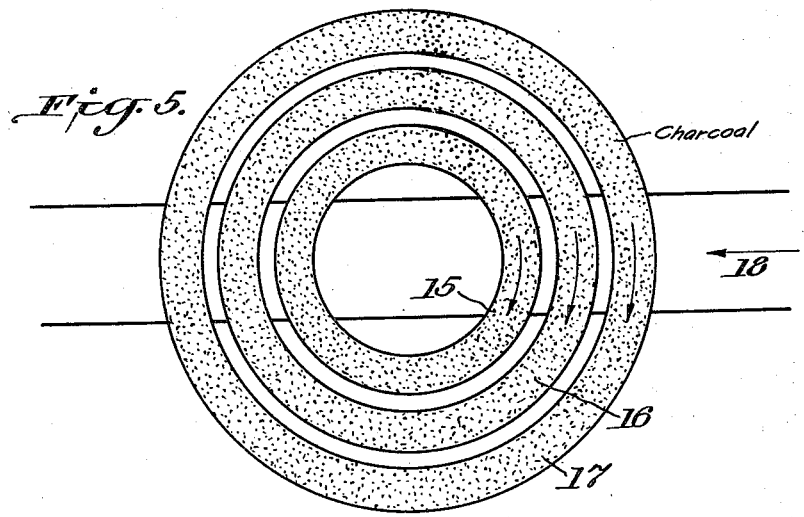
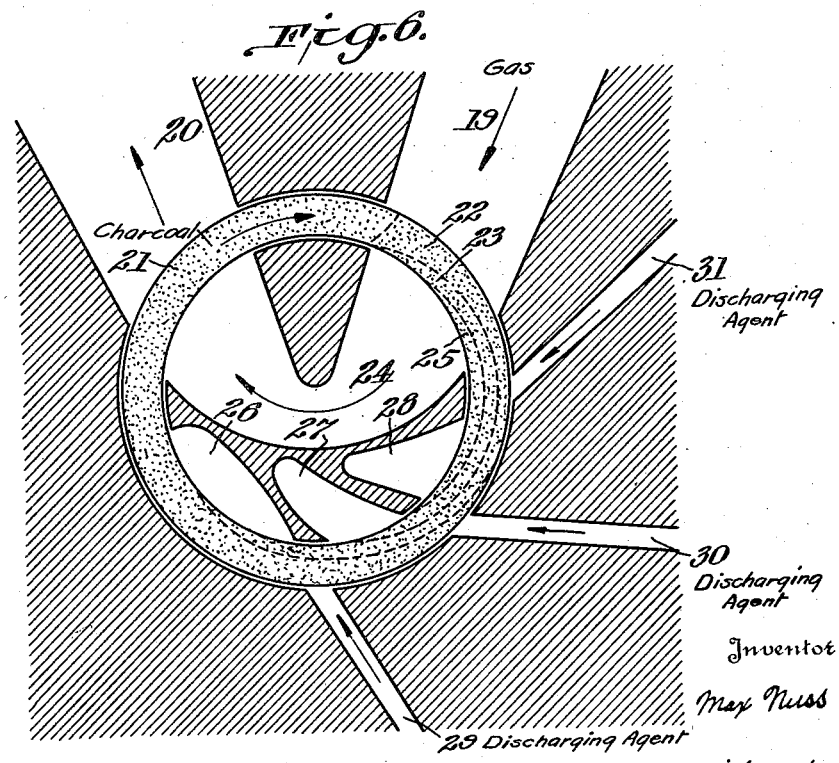

Patented Jan. 15, 1924.

1,481,221

UNITED STATES PATENT OFFICE.

MAX NUSS, OF HOCHST-ON-THE-MAIN, GERMANY, ASSIGNOR TO FARBWERKE VORM. MEISTER LUCIUS & BRÜNING, OF HOCHST-ON-MAIN, GERMANY, A CORPORATION OF GERMANY.

PROCESS FOR SEPARATING GAS AND VAPOR MIXTURES.

Application filed March 21, 1923. Serial No. 626,631.

*To all whom it may concern:*

Be it known that I, MAX NUSS, a citizen of Germany, residing at Hochst-on-the-Main, Germany, have invented certain new and useful Improvements in a Process for Separating Gas and Vapor Mixtures, of which the following is a specification.

The separation of gas- and vapor mixtures into their components or into mixtures of certain of their components can be effected by the absorption of such gas- and vapor mixtures, or parts of them, by means of porous (active) charcoal. A part of the mixture may, for instance, be allowed to pass over the charcoal unabsorbed or the whole of the mixture may be absorbed on a long layer of charcoal, on which the various components are distributed according to the degree of their capacity of being absorbed, whereupon certain selected portions of the absorbing layer may be withdrawn from the absorbing operation and that part of the mixture which has been absorbed therein may be liberated therefrom by expelling or dissolving it or by any other means.

In order to secure a reliable effect and one which is effective for a substantial period of time and to avoid a too frequent withdrawal of parts of the charcoal for the regeneration thereof and the recovery of the absorbed gas the above described processes require large and extensive layers of charcoal through which the mixture must pass, which involves of course the necessity of overcoming relatively strong resistances.

Now we have found that the separation may be carried out in a much more advantageous manner by using instead of a thick layer of charcoal a thinner one, which is moved transversely through the stream of the mixture or over which the stream of the mixture to be separated is passed. During this operation it is, as a rule, preferable to arrange the charcoal in a continuous layer and to expel the absorbed material from it on its further course until it is reintroduced into the stream of the mixture or to expel the absorbed material from the charcoal after the passage of the stream, which may be done in any manner; and the layer may, if required, also be cooled or subjected to any other treatment in order to restore it again to the highest degree of absorbing capacity. By regulating the relation of the rapidity of movement of the charcoal layer or of the change of direction of the passage of the gas and vapor stream to the rapidity of passage of the gas mixture one may selectively absorb upon the charcoal either that part of the mixture which is most easily absorbed or that part which comes next as regards absorbability and so on.

There may also be connected in series several of such continuously working absorption bands either by arranging them concentrically or by letting them follow each other independently. Thus it is possible to separate the components of the mixture from each other with the utmost exactness by regulating the rapidity of movement of the various absorption bands according to the absorption conditions. The components of the mixture may then be continuously isolated in any suitable manner from the several bands.

Instead of regulating the rate of movement of the bands, or simultaneously therewith, there may also be used charcoal of different absorbing capacity, in which case as a rule the mixture is first contacted with a charcoal of an inferior absorbing capacity—such for instance as ordinary wood charcoal—and in the further course of the process with charcoal of ever increasing absorbing capacity. In certain cases it may also be advantageous to intercalate between successive treatments with highly-active charcoal a treatment with charcoal of a weaker absorbing activity, for instance for absorbing components of the mixture which are perhaps present only in a small quantity or of little value. The charcoal of inferior activity placed before or between the bands of highly active charcoal need not be used in a movable layer.

By using first charcoal of inferior activity, which, as a rule, is much cheaper than the chemically activated charcoal—such as for instance ordinary wood charcoal—it is possible to realize a considerable economy and a conservation of the activity of the activated charcoal which can then work with greater efficacy, particularly as regards the purity of the main components of the mixture separated.

The separation of the components of a mixture by means of a continuous band of absorbent material can also be effectuated by loading first one band, or each of several bands, with several components of the mixture and then separately collecting fractions of the absorbed material expelled from the charcoal by means of water-vapor or gases while utilizing the fact that in this case the absorbed components are expelled in the inverse order of their capacity of being absorbed. This operation can be carried out either by conducting separate streams of the expelling agent through the band or by introducing a single stream of the expelling agent and subdividing it at the outlet into several portions.

The new process makes it possible to separate mixtures of gases and vapors in a continuous manner while utilizing the continuously regenerated highest absorption-capacity of the charcoal, and at the same time avoiding strong resistances and using very small quantities of charcoal. The fact that the process requires only a very small space is of special importance. Moreover the consumption of the discharging or expelling agent, for instance steam, is very small in consequence of the only thin layer of charcoal acted upon.

In the accompanying drawing the invention is schematically illustrated in several different forms.

Fig. 1 illustrates the movement of a band of charcoal 1 in a thin layer through the gas stream 2.

Fig. 2 illustrates the movement of the gas stream 3 with its reception chamber 7, as well as the stream of discharging agent 4 with its reception chamber 6, along the charcoal band 5.

Fig. 3. Here the charcoal is arranged as an endless band 8 which is led through the gas stream 9. The charcoal can be regenerated and cooled in its circuit.

Fig. 4. The gas stream 12 with the reception chamber 11, and the stream of discharging agent 13 with the reception chamber 10 are led along the fixed endless charcoal band 14 in which of course the parts are relatively stationary.

Fig. 5. The endless charcoal bands 15, 16, and 17 are arranged concentrically and move through the gas stream 18 at a rate corresponding to the capacity of the gas constituents of being absorbed.

The charcoal bands may also lie side by side or follow each other in various single apparatus and be treated efficaciously on their way.

Fig. 6 serves as an example of another mode of carrying out the invention. The endless charcoal band 21 passes through the gas stream 19, 24, 20, and on its way takes up in strata the single gas components—e. g. 22, 23, and 25—according to the proportion of absorption, thickness and number of the layers and the rate of movement of the charcoal band. Then the charcoal band passes the discharging agent inlets 31, 30, and 29. By means of the entering discharging agent there is expelled first the gas component which has been loaded last upon the charcoal band, then the next etc., and separately collected in the reception chambers 28, 27, and 26. The discharged active charcoal is cooled in its further course by the purified gas and the process begins again.

As another feature of this process may be mentioned the use of packed charcoal, in the form of traveling bands which by means of suitably arranged mechanism are conducted through the stream of the mixture of gases or vapors to be absorbed or separated, thus allowing the gas or vapor to take essentially the shortest path through the charcoal.

Claims—

1. In the process for the separation of gas and vapor mixtures by absorption by means of charcoal, the step which consists in arranging the charcoal in a band in which the parts are relatively stationary and moving said band through a stream of the mixture to be separated.

2. In the process for the separation of gas and vapor mixtures by absorption by means of charcoal, the step which consists in conducting a stream of the mixture to be separated successively through separate portions of a band of charcoal in which the parts are relatively stationary.

3. In the process for the separation of gas and vapor mixtures by absorption by means of charcoal, the step which consists in successively and repeatedly subjecting separate portions of an endless band carrying charcoal to a stream of a mixture to be separated and to treatment for the recovery of the absorbed substances and the regeneration of the charcoal.

4. In the process for the separation of gas and vapor mixtures by absorption by means of charcoal, the step which consists in collecting charcoal in a plurality of moving bands in which the parts are relatively stationary, and passing the mixture to be separated through said bands.

5. In the process for the separation of gas and vapor mixtures by absorption by means of charcoal, the step which consists in passing a stream of the mixture to be separated through a band of charcoal in which the parts are relatively stationary and causing a relative movement of the stream and of the band at such a rate as to obtain the desired distribution of the absorbed components on said band.

6. In the process for the separation of gas and vapor mixtures by absorption by means of charcoal, the step which consists in passing a plurality of bands of charcoal at predetermined different rates of speed in parallel through a stream of the mixture to be separated.

7. The step in the process of separating gas and vapor mixtures as defined in claim 6 in which charcoal bands containing charcoal of different absorbing activity are employed.

8. In the process for the separation of gas and vapor mixtures by absorption by means of charcoal, the steps which consist in passing a stream of the mixture to be separated through a moving band of charcoal, thereby loading the components of said mixture upon said band and fractionally discharging said components from said band.

In testimony whereof, I affix my signature.

MAX NUSS.

Witnesses:
W. W. SCHOTT,
C. C. L. B. WYLES.